United States Patent
Noller et al.

(10) Patent No.: US 8,801,368 B2
(45) Date of Patent: Aug. 12, 2014

(54) GEAR TRANSMISSION HAVING A GEAR WHEEL ARRANGED ON A HOLLOW SHAFT AND WIND POWER PLANT

(75) Inventors: Klaus Noller, Oppenweiler (DE); Gerhard Bauer, Witten (DE); Guenter Berger, Castrop-Rauxel (DE)

(73) Assignee: Robert Bosch GmbH, Stuttgart (DE)

( * ) Notice: Subject to any disclaimer, the term of this patent is extended or adjusted under 35 U.S.C. 154(b) by 529 days.

(21) Appl. No.: 13/202,576

(22) PCT Filed: Feb. 17, 2010

(86) PCT No.: PCT/EP2010/000983
§ 371 (c)(1),
(2), (4) Date: Oct. 31, 2011

(87) PCT Pub. No.: WO2010/094461
PCT Pub. Date: Aug. 26, 2010

(65) Prior Publication Data
US 2012/0039715 A1  Feb. 16, 2012

(30) Foreign Application Priority Data

Feb. 21, 2009 (DE) .......................... 10 2009 010 035
Apr. 11, 2009 (DE) .......................... 10 2009 017 301

(51) Int. Cl.
*F03D 11/00* (2006.01)
(52) U.S. Cl.
USPC .................................... 415/124.1; 416/170 R
(58) Field of Classification Search
USPC .................................... 416/170 R; 415/124.1
See application file for complete search history.

(56) References Cited

U.S. PATENT DOCUMENTS

| | | | | |
|---|---|---|---|---|
| 1,725,127 A | * | 8/1929 | Bethel | 464/82 |
| 2,839,943 A | * | 6/1958 | Caldwell et al. | 74/445 |
| 4,871,923 A | * | 10/1989 | Scholz et al. | 290/55 |
| 6,872,049 B2 | * | 3/2005 | Christensen | 415/124.1 |

FOREIGN PATENT DOCUMENTS

| | | |
|---|---|---|
| DE | 25 42 634 | 4/1977 |
| DE | 27 39 596 | 3/1979 |
| DE | 34 23 993 | 1/1985 |
| DE | 34 25 600 | 1/1986 |
| DE | 103 05 074 | 8/2004 |
| DE | 10 2008 016 161 | 10/2008 |

OTHER PUBLICATIONS

International Search Report corresponding to PCT Application No. PCT/EP2010/000983, mailed May 18, 2010 (German and English language document) (5 pages).
International Search Report and Written Opinion corresponding to PCT Application No. PCT/EP2010/000983, (German and English language document) (18 pages), Mailed May 18, 2010.

* cited by examiner

*Primary Examiner* — Ninh H Nguyen
(74) *Attorney, Agent, or Firm* — Maginot, Moore & Beck

(57) ABSTRACT

A gear transmission having at least one gear wheel stage, wherein at least one of the gear wheels is fastened coaxially on a hollow shaft that is rotatably mounted in a transmission housing via at least two shaft bearings. An outside-radial stage offset is formed on the hollow shaft as a seat for a broad rim gear wheel that approaches the plant radially on the inside.

18 Claims, 1 Drawing Sheet

GEAR TRANSMISSION HAVING A GEAR WHEEL ARRANGED ON A HOLLOW SHAFT AND WIND POWER PLANT

This application is a 35 U.S.C. §371 National Stage Application of PCT/EP2010/000983, filed Feb. 17, 2010, which claims the benefit of priority to both Application Serial No. DE 10 2009 010 035.0, filed Feb. 21, 2009 in Germany, and Application Serial No. DE 10 2009 017 301.3, filed Apr. 11, 2009 in Germany, the disclosures of all three of the above-identified applications are incorporated herein by reference in their entirety.

BACKGROUND

The present disclosure relates to a gearwheel transmission having at least one gearwheel stage in which at least one of the gearwheels is fastened coaxially on a hollow shaft which is rotatably mounted in a transmission housing by means of at least two shaft bearings. The disclosure also relates to a wind power plant which comprises a gearwheel transmission of said type.

The preferred field of use of the present disclosure is wind power plant technology. In particular in the case of wind power plants of relatively high power, that is to say above approximately 1.5 megawatts, use is generally made of extremely large gearwheel transmissions in order to step up a low rotational speed of a rotor which is impinged on by wind, such that an electric generator for generating electrical energy can be driven at a suitable higher rotational speed. Furthermore, gearwheel transmissions of the type of interest here may also be used in other technical fields, such as marine technology, motor vehicle technology and the like, preferably where large transmissions of the above-specified higher power classes are concerned.

DE 34 23 993 A1 concerns a large transmission of the type of interest here, which is formed with a plurality of gearwheel stages. Said gearwheel transmission is designed as a multi-way transmission with power splitting and comprises an adjustable pinion arrangement for power distribution between a plurality of power paths, which pinion arrangement, in the manner of a planetary gear set, is connected upstream of a further load distributor device such that two or more coaxially arranged pinions with defined power division may be provided. The number of power branches is multiplied according to the number of pinions. This results in an extremely compact transmission of high power density. This design principle entails the use of hollow shafts, through the inner duct of which further shafts are guided in this case. The hollow shaft is provided, radially at the outside, with a gearwheel in order to transmit the power flow onward by means of a spur gear pairing. Here, however, said gearwheel is always a pinion.

DE 27 39 596 A1 discloses another gearwheel transmission in which not the pinion but rather the larger gearwheel which meshes with said pinion is arranged on hollow shafts. In specific terms, two large gears which are connected to the drive output shaft of the gearwheel transmission are arranged on hollow shafts which are in alignment with one another and which are mounted in each case separately in the transmission housing. Those ends of the two coaxial hollow shafts which face toward one another are connected to the drive output shaft via toothed couplings. Each hollow shaft is rotatably mounted in the valve housing by means of two shaft bearings arranged on each end side. Each hollow shaft has a tubular diameter which remains constant in principle, and the respectively associated large gearwheels have a toothing diameter which is a multiple of the shaft diameter. These geometric relationships result in extremely massive gearwheels which must be manufactured from a high-grade toothing material in order to be able to withstand the loadings during operation. In contrast, the associated hollow shafts are generally produced from a tempering steel.

Such massive gearwheels disadvantageously result in an extremely high overall weight of a gearwheel transmission equipped with said gearwheels.

Furthermore, a hollow shaft produced from relatively high-grade steel such as tempering steel has the disadvantage of a cumbersome material with corresponding heat treatment and subsequent elaborate machining.

SUMMARY

It is therefore the object of the present disclosure to further improve a gearwheel transmission of the generic type so as to obtain simplified production and a material saving.

The object is achieved, taking as a starting point a gearwheel transmission as set forth hereinbelow, in conjunction with the remainder of the disclosure including the advantageous refinements set forth below.

The disclosure encompasses the technical teaching that the hollow shaft has integrally formed on it a radially external step shoulder as a seat for the bandage-like gearwheel which comes into contact therewith radially at the inside. The thickness of the bandage-like gearwheel can be varied by means of the shoulder height of the step shoulder. To obtain the greatest possible material saving, the shoulder height of the step shoulder should be as great as possible, preferably greater than the average tube thickness of the hollow shaft.

An advantage of the solution according to the disclosure is that the gearwheel assigned to the special hollow shaft need merely be formed in the manner of a bandage, that is to say in the form of an extremely thin-walled ring, such that the high-strength steel material required for this is used sparingly. The solution according to the disclosure permits not only the material and therefore weight saving but also a novel combination, which involves less expenditure than the prior art, of different materials for hollow shaft and gearwheel. Tests have shown that the solution according to the disclosure reduces the overall component weight by more than 10% while simultaneously reducing the tempering steel and heat treatment weight by more than 35%. If a shrink-fit process is used for fastening the bandage-like gearwheel, the reduced volume and weight of the bandage-like gearwheel to be heated has an advantageous effect, in particular with regard to process reliability.

The bandage-like gearwheel is fixed on the hollow shaft preferably by means of a shaft-hub connection. Here, both a non-positively locking and also a positively locking connection are conceivable. For example, if the gearwheel is fixed on the hollow shaft in a non-positively locking manner by means of a shrink fit, an additional positively locking securing means may also be provided for preventing a relative movement at high torques. Such a positively locking securing means may be realized by means of a spline profiling or, in the simplest case, by means of at least one parallel key.

It is proposed that the hollow shaft be produced from a cast material. Ductile iron, for example GGG40.3, is particularly suitable. Ductile iron is cast iron with nodular graphite, in which the graphite phase is present in the form of spheres in the matrix. As a result of the spherical form of the graphite, the material has an extremely high tensile strength, ductility and impact strength.

The hollow shaft may alternatively also be forged from a tempering steel, such as for example C45 or a steel of a higher grade. Die forging may be used as a forging technique. In die forging, the required accuracies with regard to dimensions can be obtained as standard. The material, on account of its high tensile strength and its high ductility, permits a reduction in the material thicknesses of the hollow shaft in relation to ductile iron.

In a measure which improves the disclosure, it is proposed that the inner wall of a hollow shaft has a ring-shaped material recess in the region of a gearwheel which surrounds said hollow shaft in the manner of a bandage.

As a result of said measure, the material accumulation generated per se by the attachment of the gearwheel to the hollow shaft is utilized to cut out material from the inner ring of the hollow shaft in the radially outward direction, so as to yield a weight reduction. Here, said weight reduction takes place at a location which otherwise does not adversely affect the strength properties of the spur gear stage. In principle, the solution according to disclosure provides the hollow shaft with a strength-optimized contour, such that it can be produced from a much simpler material than tempering steel.

The recess in the inner wall of the hollow shaft should optimally have, in relation to the hollow shaft, a longitudinal sectional profile coordinated with the loading of the hollow shaft caused by the tooth engagement of the gearwheel. Strength tests have shown that such a suitable sectional profile is preferably asymmetrical. This is because the power flow which conventionally runs between the tooth engagement point of the gearwheel and an end of the hollow shaft is, in the transition region from the hollow shaft radially outwards in the direction of the gearwheel, not symmetrical with respect to the gearwheel plane. An asymmetrical longitudinal sectional profile of the recess coordinated with this permits a maximum removal of material without an impairment of strength properties. Here, the longitudinal sectional profile may be formed from a juxtaposition of surfaces and radii of different size. In particular, the gradient of the transition between the straight inner wall and the recess defines the characteristics explained above. It is thus preferably possible for as obtuse an angle as possible, a wall inclined at an obtuse angle, obtuse-angled transitions or else rounded transitions to be used at the torque-input-side wall of the recess. A wall of the recess which, in an imaginary projection, converges on an edge of the gearwheel situated remote from the torque input of the hollow shaft could be advantageous with regard to strength considerations. In designing the recess, it must also be ensured that admissible dynamic loading limits for the cast material used are adhered to.

The greater the shoulder height, the deeper the annular recess can be formed into the inner wall of the hollow shaft without undershooting the required minimum wall thicknesses. Here, a structural limit naturally forms the minimum thickness, which must be adhered to, of the bandage-like gearwheel. If said minimum thickness is undershot, the gearwheel may fail. The depth of the recess could for example correspond approximately to the average tube thickness of the hollow shaft, though a greater or smaller depth is likewise conceivable.

BRIEF DESCRIPTION OF THE DRAWINGS

Further measures which improve the disclosure are specified in the dependent claims or will be explained in greater detail below together with the description of a preferred exemplary embodiment of the disclosure, in which:

DETAILED DESCRIPTION

Figure 1:
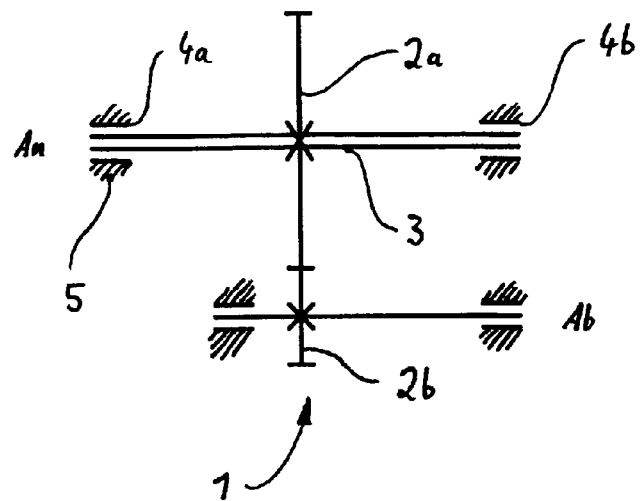
FIG. 1 shows a diagrammatic illustration of a gearwheel stage, formed as a spur gear stage, of a gearwheel transmission.

According to FIG. 1, a gearwheel transmission—not all of the details of which are illustrated here—comprises a gearwheel stage 1 which is constructed from two gearwheels 2a and 2b. The two gearwheels 2a and 2b are formed as helically toothed spur gears. The gearwheel 2a is fastened coaxially on a hollow shaft 3 and the hollow shaft 3 is mounted, so as to be rotatable relative to a transmission housing 5, at both sides of the gearwheel 2a by means of two shaft bearings 4a and 4b. The two shaft bearings 4a and 4b are formed as rolling bearings.

Figure 2:
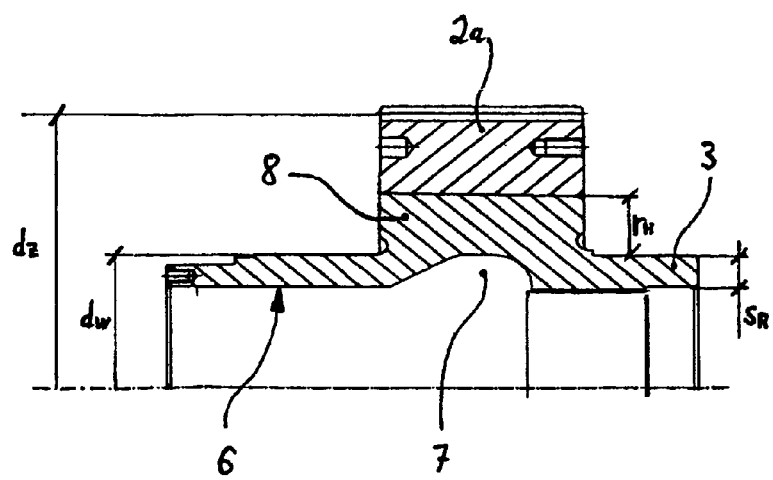
FIG. 2 shows a partial section of a gearwheel fastened to a hollow shaft of the gearwheel transmission as per FIG. 1.

According to FIG. 2, in the region in which the hollow shaft 3 is surrounded at the outside by the gearwheel 2a, an annular recess 7 is provided on an inner wall 6 of the hollow shaft 3, which annular recess constitutes a material cutout with a visibly asymmetrical longitudinal sectional profile.

The longitudinal sectional profile of the recess 7 is coordinated with the loading of the hollow shaft 3 caused by the tooth engagement of the gearwheel 2a fastened to said hollow shaft and by the torque to be transmitted.

To make the gearwheel 2a as bandage-like as possible, that is to say as thin-walled as possible, said gearwheel is seated on a radially external step shoulder 8 of the hollow shaft 3. Here, the shoulder height $r_R$ of the step shoulder 8 is approximately twice as large as the average tube thickness $s_R$ of the hollow shaft 3 in order to be able, for the purpose of saving material, to produce an annular recess 7 of adequate depth while at the same time maintaining as thin-walled a gearwheel 2a as possible.

Whereas the hollow shaft 3 in this exemplary embodiment is composed of a ductile iron material, the bandage-like gearwheel 2a is composed of a case-hardened steel. To obtain a significant material saving effect, the ratio of toothing diameter $d_Z$ of the gearwheel 2a to the shaft diameter $d_W$ of the associated hollow shaft 3 forms at least a factor $\geq 1.5$.

Alternatively, the hollow shaft may also be produced from tempering steel, for example C45, using die forging technology. The higher tensile strength of the steel in relation to ductile iron material permits, if appropriate, a reduction of the material thicknesses on the hollow shaft. The recess 7 may thus be made deeper if appropriate, or the step shoulder 8 may be provided with axial apertures or with a contour which is concave in longitudinal section.

The disclosure is not restricted to the preferred exemplary embodiment described above. Modifications of the disclosure are in fact also possible which are also encompassed by the scope of protection of the subsequent claims. For example, instead of helically toothed spur gears, it is also conceivable within the context of the gearwheel stage designed according to the disclosure to use other gearwheels which, located on at least one associated hollow shaft, perform the function according to the disclosure in conjunction with the annular recess on the hollow shaft. Here, it must however be ensured that the longitudinal sectional profile of the annular recess is matched to the respective gearwheel type and tooth engagement geometry. Within the context of the disclosure, the annular recess may also be formed in the shape of a ring segment.

LIST OF REFERENCE SYMBOLS

1 Gearwheel stage
2 Gearwheel

3 Hollow shaft
4 Shaft bearing
5 Transmission housing
6 Inner wall
7 Recess
8 Step shoulder
$r_A$ Height
$s_R$ Tube thickness
$d_Z$ Toothing diameter
$d_W$ Shaft diameter

The invention claimed is:

1. A gearwheel transmission having at least one gearwheel stage in which at least one of the gearwheels is fastened coaxially on a hollow shaft which is rotatably mounted in a transmission housing by at least two shaft bearings, wherein the hollow shaft has integrally formed on it a radially external step shoulder as a seat for a bandage-like gearwheel which comes into contact therewith radially at the inside.

2. The gearwheel transmission as claimed in claim 1, wherein the inner wall of the hollow shaft has a ring-shaped or ring-segment-shaped recess in the region of the gearwheel which surrounds in the manner of a bandage.

3. The gearwheel transmission as claimed in claim 2, wherein the recess has a longitudinal sectional profile coordinated with the loading of the hollow shaft caused by the tooth engagement of the gearwheel.

4. The gearwheel transmission as claimed in claim 3, wherein the longitudinal sectional profile of the recess is asymmetrical.

5. The gearwheel transmission as claimed in claim 1, wherein the shoulder height of the step shoulder is greater than the average tube thickness of the hollow shaft.

6. The gearwheel transmission as claimed in claim 1, wherein the hollow shaft is produced by primary forming from a cast material.

7. The gearwheel transmission as claimed in claim 6, wherein the hollow shaft is produced from ductile iron.

8. The gearwheel transmission as claimed in claim 7, wherein the ductile iron is GGG40.3.

9. The gearwheel transmission as claimed in claim 1, wherein the hollow shaft is produced by a deformation process.

10. The gearwheel transmission as claimed in claim 9, wherein the hollow shaft is produced from a tempering steel.

11. The gearwheel transmission as claimed in claim 10, wherein the hollow shaft is produced from a C45 steel.

12. The gearwheel transmission as claimed in claim 9, wherein the hollow shaft is produced by die forging.

13. The gearwheel transmission as claimed in claim 1, wherein the gearwheel is composed of a case-hardened steel.

14. The gearwheel transmission as claimed in claim 1, wherein the bandage-like gearwheel is fixed on the hollow shaft by a shaft-hub connection.

15. The gearwheel transmission as claimed in claim 1, wherein the ratio of toothing diameter of the gearwheel to shaft diameter of the associated hollow shaft is greater than 1.5.

16. The gearwheel transmission as claimed in claim 1, wherein the gearwheel stage is composed of gearwheels configured as helically toothed spur gears.

17. The gearwheel transmission as claimed in claim 1, wherein the gearwheel stage is configured, with regard to the dimensioning of the gearwheels; and of the respectively associated shafts, for powers of greater than 1 kilowatt.

18. A wind power plant for generating electrical energy, in which wind power plant a gearwheel transmission as claimed in claim 1 steps up a low rotational speed of a wind-powered rotor into a higher rotational speed suitable for an electric generator.

* * * * *

UNITED STATES PATENT AND TRADEMARK OFFICE
CERTIFICATE OF CORRECTION

PATENT NO. : 8,801,368 B2
APPLICATION NO. : 13/202576
DATED : August 12, 2014
INVENTOR(S) : Noller et al.

It is certified that error appears in the above-identified patent and that said Letters Patent is hereby corrected as shown below:

In the Claims

In column 6, lines 26-29, claim 17 should read:

17. The gearwheel transmission as claimed in claim 1, wherein the gearwheel stage is configured with regard to the dimensioning of the gearwheels and of the respectively associated shafts, for powers of greater than 1 kilowatt.

Signed and Sealed this
Sixteenth Day of June, 2015

Michelle K. Lee
*Director of the United States Patent and Trademark Office*